(12) United States Patent
Cady

(10) Patent No.: US 9,272,615 B1
(45) Date of Patent: Mar. 1, 2016

(54) VAPOR TRANSPORT FUEL INTAKE SYSTEM

(71) Applicant: David D. Cady, Murrells Inlet, SC (US)

(72) Inventor: David D. Cady, Murrells Inlet, SC (US)

(*) Notice: Subject to any disclaimer, the term of this patent is extended or adjusted under 35 U.S.C. 154(b) by 0 days.

(21) Appl. No.: 14/074,234

(22) Filed: Nov. 7, 2013

(51) Int. Cl.
| | | |
|---|---|---|
| *F02M 29/00* | (2006.01) | |
| *B60K 15/03* | (2006.01) | |
| *F02M 31/18* | (2006.01) | |
| *F02M 25/08* | (2006.01) | |
| *F02M 21/02* | (2006.01) | |

(52) U.S. Cl.
CPC ............ *B60K 15/03* (2013.01); *F02M 21/0221* (2013.01); *F02M 25/08* (2013.01); *F02M 31/18* (2013.01)

(58) Field of Classification Search
CPC ... F02M 31/18; F02M 25/0836; F02M 25/08; F02M 21/0221; B60K 15/03519; B60K 15/035; B60K 2015/03514; F02D 41/003; F02D 41/0045; Y10S 261/83; Y10T 137/86324; B01D 2259/4516
USPC .................. 123/590, 522, 520, 549
See application file for complete search history.

(56) References Cited

U.S. PATENT DOCUMENTS

| | | | | |
|---|---|---|---|---|
| 3,519,407 | A * | 7/1970 | Hilborn .......................... | 123/590 |
| 3,756,747 | A * | 9/1973 | Caffrey ........................... | 417/34 |
| 3,931,801 | A * | 1/1976 | Rose et al. .................... | 123/522 |
| 4,318,386 | A | 3/1982 | Showalter et al. | |
| 4,397,286 | A * | 8/1983 | Jackson et al. ................. | 123/523 |
| 4,848,302 | A | 7/1989 | Firey | |
| 5,020,484 | A * | 6/1991 | Ishikawa et al. .......... | 123/73 AD |
| 5,490,488 | A | 2/1996 | Aversa et al. | |
| 5,809,976 | A * | 9/1998 | Cook et al. .................... | 123/516 |
| 5,957,072 | A * | 9/1999 | Hattori ........................ | 114/55.57 |
| 6,526,952 | B1 * | 3/2003 | Price ...................... | F02M 17/22 123/522 |
| 6,581,902 | B2 * | 6/2003 | Michau et al. ................. | 251/126 |
| 7,028,675 | B2 * | 4/2006 | Bushnell et al. .............. | 123/546 |
| 7,198,254 | B2 | 4/2007 | Holloway et al. | |
| 7,270,117 | B1 * | 9/2007 | Devall ............................ | 123/516 |
| 7,438,277 | B2 * | 10/2008 | Jacobsen .................... | F16K 3/24 239/200 |
| 7,793,621 | B2 | 9/2010 | Stehl et al. | |
| 7,909,024 | B2 * | 3/2011 | Rea ..................... | B01D 53/0431 123/516 |
| 8,100,114 | B2 | 1/2012 | Rowley | |
| 8,128,056 | B2 * | 3/2012 | Jung .......................... | 251/30.01 |
| 8,555,851 | B2 * | 10/2013 | Wenger et al. ............ | 123/196 R |
| 2010/0224158 | A1 * | 9/2010 | Oakes ...................... | 123/184.47 |

* cited by examiner

*Primary Examiner* — Lindsay Low
*Assistant Examiner* — James Kim
(74) *Attorney, Agent, or Firm* — The Law Firm of P. Jeffrey Martin, LLC; P. Jeff Martin

(57) ABSTRACT

A fuel intake system for supplying an internal combustion engine with a fuel vapor/air mixture without the use of a carburetor or fuel injectors. The fuel intake system includes a tank holding fuel and an evaporated fuel vapor. An air inlet tube and a vapor outlet tube are coupled to the tank. A vapor conditioner is coupled between the vapor outlet tube and the engine. The vapor conditioner has a vapor conditioner throttle body with a butterfly valve. The vapor conditioner regulates the fuel vapor/air mixture by selective positioning of the butterfly valve.

6 Claims, 3 Drawing Sheets

US 9,272,615 B1

VAPOR TRANSPORT FUEL INTAKE SYSTEM

I. TECHNICAL FIELD OF THE INVENTION

This invention relates to fuel systems for engines and in particular to a fuel intake system for supplying an internal combustion engine with a fuel vapor/air mixture without the use of a carburetor or fuel injectors.

II. BACKGROUND OF THE INVENTION

Conventional internal combustion engines operate using liquid fuels such as gasoline or diesel fuel. The liquid fuel is pumped by a fuel pump to the engine and delivered under low pressure to a carburetor or under high pressure to a fuel injection system.

A carburetor uses engine vacuum or suction created by intake air accelerated through a venturi tube to draw liquid fuel into an airstream in an intake manifold. Fuel injection systems have more recently replaced carburetors in many engine applications. A fuel injection system atomizes liquid fuel by forcibly pumping it through a small nozzle under high pressure into an intake manifold or directly into a combustion chamber.

Unfortunately, carburetors and fuel injection systems have numerous manufacturing and operational drawbacks. Carburetors and fuel injection systems both have components with small passages and tight tolerances that are expensive to fabricate. The small passages are subject to clogging by debris and accumulated varnish and gum from the fuel over time. The clogged passages are difficult to identify, locate and effectively clean. Another problem with carburetors and fuel injection systems is that they do not completely atomize the liquid fuel which causes increased fuel consumption, increased exhaust emissions and pollution. A reduction in exhaust emissions can reduce the need for expensive pollution control components.

III. SUMMARY OF THE INVENTION

Example embodiments provide a fuel intake system for supplying an internal combustion engine with a fuel vapor/air mixture without the use of a carburetor or fuel injectors. The fuel vapor/air mixture ratio is selectively regulated by positioning of a vapor conditioner throttle body butterfly valve.

According to one embodiment of the present invention, a fuel intake system for supplying an engine with a fuel includes a tank having an internal reservoir for holding the fuel and an evaporated fuel vapor above the fuel. An air inlet tube is coupled to the tank and is in fluid communication with the internal reservoir. The air inlet tube has a first end and a second end. The second end of the air inlet tube is located within the tank and is positioned above the fuel. A vapor outlet tube is coupled to the tank and is in fluid communication with the internal reservoir. A vapor outlet tube has a first end and a second end. The second end of the vapor outlet tube is located within the tank and is positioned above the fuel. A vapor conditioner is coupled between the second end of the vapor outlet tube and the engine. The vapor conditioner has a first throttle body with a first butterfly valve. The vapor conditioner regulates a fuel vapor/air mixture ratio by selective positioning of the first butterfly valve or other fuel vapor/air mixture ratio device.

IV. BRIEF DESCRIPTION OF THE DRAWINGS

V. DETAILED DESCRIPTION OF THE INVENTION

It will be readily understood that the components of the present invention, as generally described and illustrated in the figures herein, may be arranged and designed in a wide variety of different configurations. Thus, the following detailed description of the embodiments as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

Figure 1:
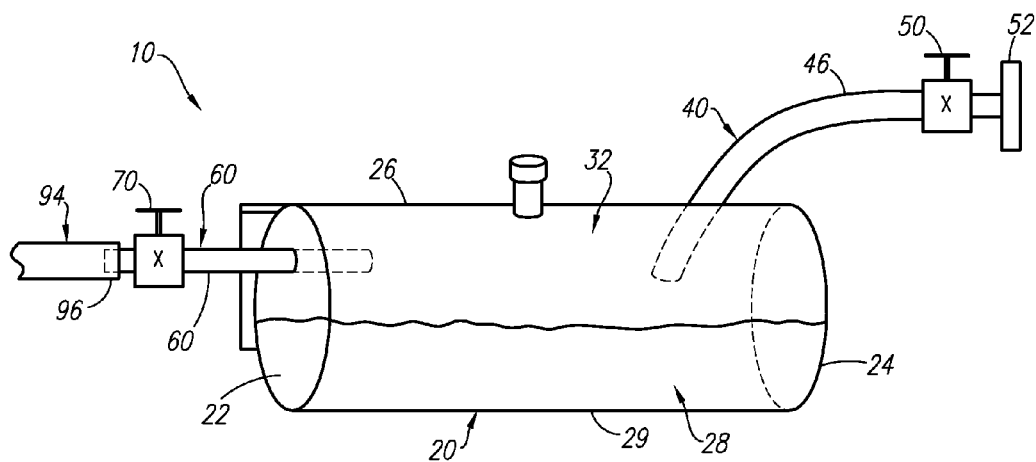
FIG. 1 illustrates a perspective view of a fuel tank, according to example embodiments.
Figure 2:
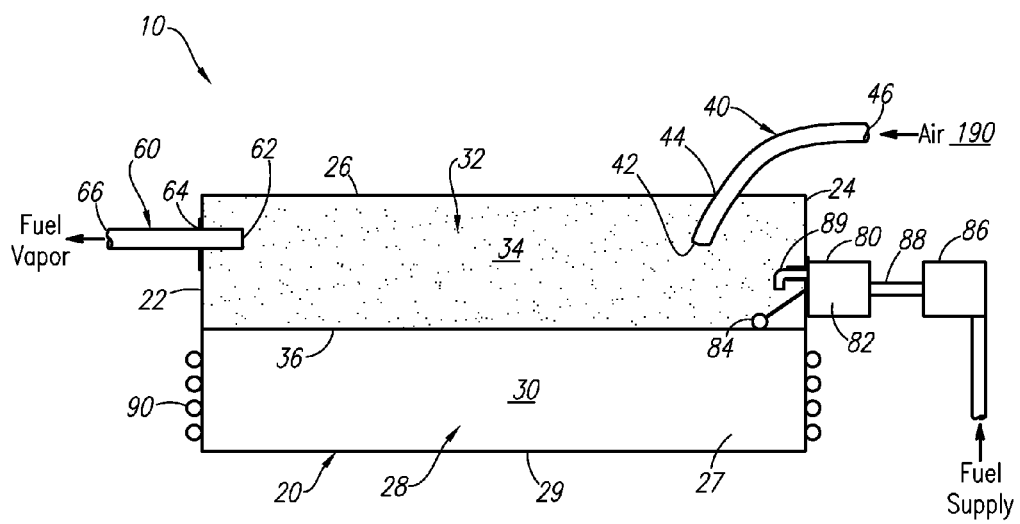
FIG. 2 illustrates a side cross-sectional view of the fuel tank of FIG. 1, according to example embodiments.

FIGS. 1 and 2 illustrate a vapor transport fuel intake system 10, according to example embodiments. Referring to FIGS. 1 and 2, the vapor transport fuel intake system 10 comprises a fuel vapor generation fuel tank 20, an air inlet tube 40, a fuel vapor outlet tube 60, a float valve 80 and a vapor conditioner 100.

The fuel vapor generation fuel tank 20 includes round end walls 22 and 24 and a cylindrical center wall 26 that extends between end walls 22 and 24. While the fuel vapor generation fuel tank 20 is shown having a cylindrical shape, other shapes such as square or rectangular can be used. In one embodiment, fuel tank 20 has dimensions of 29 inches in length and 19 inches in diameter. Fuel tank 20 can be formed from suitable materials such as metal or plastic. The fuel tank 20 has an interior surface 27 and an exterior surface 29. Walls 22, 24 and 26 define an internal reservoir 28. The internal reservoir 28 can contain a suitable liquid fuel 30 such as gasoline, alcohol, or other alternative fuels. The internal reservoir 28 can also contain other fuels such as one or more fuels that are classified as class IB flammable liquids.

The level of liquid fuel 30 within the internal reservoir 28 is regulated such that an empty or void space 32 is formed above the upper surface of the liquid fuel 30. The liquid fuel 30 within fuel tank 20 has an associated surface area 36. Because of the high vapor pressure associated with the liquid fuel 30, an evaporated fuel vapor 34 is formed above the fuel in void space 32. The vapor pressure is an indication of the evaporation rate of the liquid fuel. Substances with high vapor pressures are referred to as being volatile.

An air inlet tube 40 is coupled to the fuel tank 20 and is in fluid communication with the void space 32 of the fuel tank 20. The air inlet tube 40 has one end 42 located within the fuel tank 20 and positioned above the fuel level. The air inlet tube 40 enters the fuel tank 20 through an opening 44. The air inlet tube 40 has another end 46 located outside or external to the fuel tank 20 that can intake air 190. A shut off valve 50 is connected to end 46 and an air filter 52 is connected to the shut off valve 50. In one embodiment, the air inlet tube 40 is 1.5 inches in diameter and end 42 is located approximately 2 to 3 inches above the liquid fuel level and 6 inches from tank end 24.

A fuel vapor outlet tube 60 is coupled to the fuel tank 20 and is in fluid communication with the void space 32 of the fuel tank 20. The fuel vapor outlet tube 60 has one end 62 located within the fuel tank 20 and positioned above the fuel level. The fuel vapor outlet tube 60 enters the fuel tank 20 through an opening 64. The fuel vapor outlet tube 60 has another end 66 located outside or external to the fuel tank 20. Another shut off valve 70 is connected to end 66. In one embodiment, the fuel vapor outlet tube 60 is 1.5 inches in diameter and end 62 is located approximately 4 inches below the top of wall 26 and 6 inches from tank end 22.

A float valve 80 is mounted to fuel tank 20. The float valve 80 has a valve body 82 that is attached to end wall 24 and a float 84 that rests on the upper surface of the liquid fuel 30. The float valve 80 is in fluid communication with a pump 86 via a pipe 88. The pump supplies pressurized fuel to the float valve 80. When the level of the float 84 drops below a predetermined level, a valve within the float valve 80 opens and liquid fuel flows into reservoir 28 through a fitting 89. The float valve 80 regulates the level of liquid fuel within the fuel tank 20 to a pre-determined constant level.

Heaters 90 are mounted around fuel tank 20. The heaters 90 keep the temperature of the liquid fuel 30 relatively constant such that the evaporation rate of the liquid fuel 30 is consistent. In one embodiment, the heaters 90 are pipes that circulate hot cooling fluid from the engine.

A vacuum hose 94 is connected to shutoff valve 70 and is in fluid communication with shutoff valve 70 and with vapor conditioner 100. The vacuum hose 94 has one end 96 connected to the shutoff valve 70 and another end 98 connected to vapor conditioner 100. In one embodiment, the vacuum hose 94 has a diameter of 1.5 inches.

Figure 3:
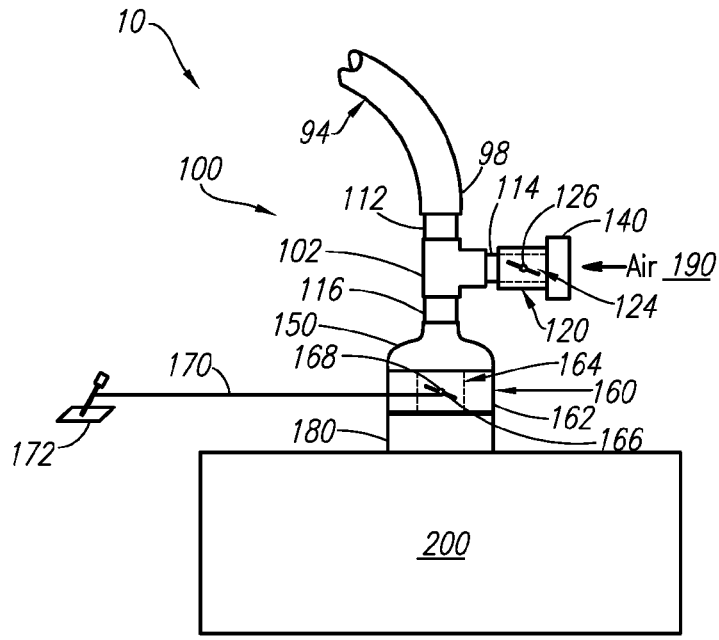
FIG. 3 illustrates a side view of a vapor conditioner and engine components, according to example embodiments.
Figure 4:
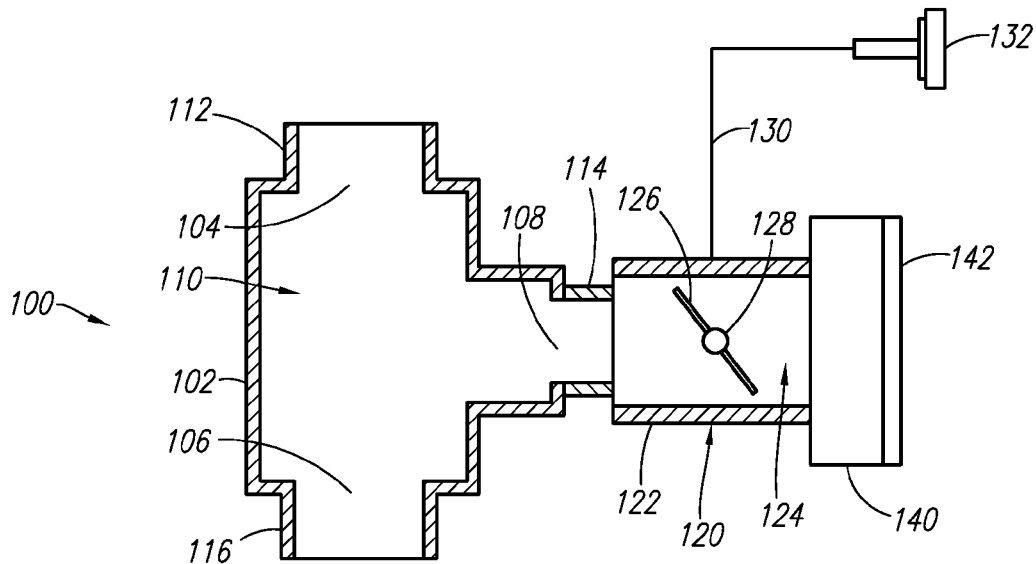
FIG. 4 illustrates a side cross-sectional view of the vapor conditioner and engine components of FIG. 3, according to example embodiments.

With reference to FIGS. 3 and 4, the vapor transport fuel intake system 10 further comprises a vapor conditioner 100. The vapor conditioner 100 includes a T shaped housing 102 that has inlet openings 104, 108, an outlet opening 106 and an internal bore or passage 110. A fitting 112 is connected between the housing 102 and the end 98 of the vacuum hose. Another fitting 114 is connected between the housing 102 and a throttle body 120. An additional fitting 116 is connected between the housing 102 and an adapter plate 150.

The vapor conditioner 100 further includes a vapor conditioner throttle body 120 that is connected to housing 102. The vapor conditioner throttle body 120 includes a body 122 with a central bore 124. A butterfly valve 126 is mounted in the bore 124. The butterfly valve 126 is attached to a rotating shaft 128 with ends that extend through the body 122. Rotation of the shaft 128 causes a like rotation of the butterfly valve 126. One end of the shaft 128 is connected to a cable 130. The other end of the cable 130 is connected to control lever or knob 132. Manual actuation of the control lever 132 by a user causes the butterfly valve 126 to move between an open position where a maximum amount of air 190 is drawn into bore 124 and a closed position where no air is admitted into bore 124. A user can selectively position the butterfly valve 126 using control lever 132 to control the amount of air 190 admitted into housing 110. The user can selectively position the butterfly valve 126 using control lever 132 to a desired fuel vapor/air mixture ratio.

An air filter 140 is connected to the body 122 and contains a filter media 142 that filters air 190 that is flowing into bore 124.

The adapter plate 150 is mounted to an engine throttle body 160. The engine throttle body 160 includes a body 162 with a central opening 164. A butterfly valve 166 is mounted in the opening 164. The body 162 is mounted between adapter plate 150 and an intake manifold 180. The intake manifold 180 is mounted to an engine 200.

The butterfly valve 166 is attached to a rotating shaft 168 with ends that extend through the body 162. Rotation of the shaft 168 causes a like rotation of the butterfly valve 166. One end of the shaft 168 is connected to an accelerator cable 170. The other end of the cable 170 is connected to an accelerator pedal 172. Depression of the accelerator pedal 172 by a user causes the butterfly valve 126 to move to an open position allowing the fuel vapor/air mixture to flow into the engine 200. A user can selectively position the butterfly valve 166 using accelerator pedal 172 to control the rotational speed or revolutions per minute (RPM) of the engine 200.

Referring to FIGS. 1-4, the operation of the vapor transport fuel intake system will now be described. During operation, an evaporated fuel vapor 34 is formed above the fuel in void space 32. When engine 200 is in rotational operation, a vacuum or suction is created in intake manifold 180. The vacuum causes air to be drawn into both air filter 52 and air filter 140. Air drawn into air filter 52 flows through shutoff valve 50, air inlet tube 40 and is directed by end 42 to impinge on the surface 36 of the liquid fuel 30 forming the evaporated fuel vapor 34. The evaporated fuel vapor 34 then flows into the vapor outlet tube 60 through shutoff valve 70 through vacuum hose 94, through fitting 112 and into vapor conditioner 100. Specifically, the evaporated fuel vapor 34 flows into passage 110 of housing 102.

Air drawn into air filter 140 flows through filter media 142 through bore 124, through fitting 114 and into passage 110. Manual actuator of the control lever 132 by a user causes the butterfly valve 126 to move between an open position where a maximum amount of air is drawn into bore 124 and a closed position where no air is admitted into bore 124. A user can selectively position the butterfly valve 126 using control lever 132 to control the amount of air admitted into passage 110. Mixing of the evaporated fuel vapor 34 and air 190 occurs in passage 110. The user can selectively position the butterfly valve 126 using control lever 132 to a desired fuel vapor/air mixture ratio.

The evaporated fuel vapor 34 by itself entering passage 110 is too rich to be used in the engine without flooding. The vapor conditioner throttle body 120 and butterfly valve 126 allow air 190 to mix with the evaporated fuel vapor 34 in passage 110 creating an optimal burnable gaseous mixture. The vapor conditioner throttle body 120 and butterfly valve 126 can be positioned to a slightly closed position to provide a richer fuel vapor/air mixture during starting of the engine. After the engine has started, the butterfly valve 126 can be moved to a more open position to provide a leaner fuel vapor/air mixture during normal operation of the engine.

The combined fuel vapor/air mixture is then drawn by the engine vacuum into the engine throttle body 160 and specifically into opening 164. Depression of the accelerator pedal 172 by a user causes the butterfly valve 166 to move to an open position allowing the fuel vapor/air mixture to flow into the intake manifold 180 and engine 200. A user can selectively position the butterfly valve 166 using accelerator pedal 172 to control the rotational speed or revolutions per minute (RPM) of the engine 200. The shutoff valves 50, 70 and the vapor conditioner butterfly valve 126 are closed when the engine is off or not running.

It is noted that the intake manifold 180 and engine 200 are absent of and do not include a fuel flow control device such that the fuel vapor/air mixture is supplied directly to an intake manifold of the engine. Fuel flow control devices such as a carburetor or fuel injectors are omitted from and are not part of the vapor transport fuel intake system.

The vapor transport fuel intake system 10 is readily used with alternative fuels. The use of vapor conditioner throttle body 120 allows for quick adjustment of the fuel vapor/air mixture ratio of an alternative fuel supplied to the engine.

Figure 5:
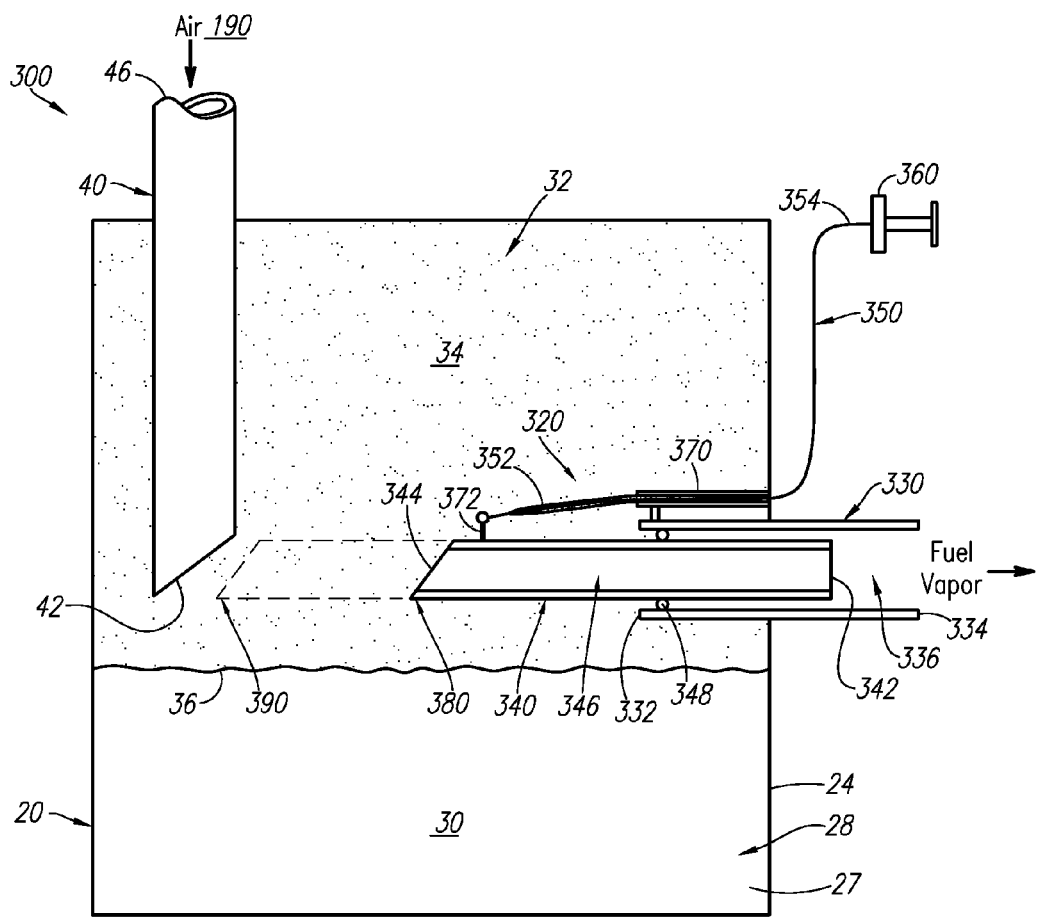
FIG. 5 illustrates a side cross-sectional view of an alternative embodiment of a fuel tank and vapor conditioner, according to example embodiments.

FIG. 5 illustrates an alternative embodiment of a vapor transport fuel intake system 300. Referring to FIG. 5, the vapor transport fuel intake system 300 comprises a fuel vapor generation fuel tank 20, an air inlet tube 40, and a vapor conditioner 320.

The fuel tank 20 and air inlet tube 40 are the same as previously described. The vapor conditioner 320 includes a fixed outer tube 330, a sliding inner tube or sleeve 340 and a cable 350.

The hollow outer tube 330 is mounted to tank wall 24 and has one end 332 located within the fuel tank 20 and positioned above the fuel level and another end 334 located outside or external to the fuel tank 20. A bore 336 extends through outer tube 330.

The sliding inner sleeve 340 has one end 342 mounted within bore 336 and another end 344 positioned above the fuel level. A bore 346 extends through inner sleeve 340. A gasket 348 forms a seal between sliding inner sleeve 340 and outer tube 330. The sliding inner sleeve 340 can slide in a linear manner within bore 336 between a retracted or rich position 380 that is farther from inlet tube end 42 and an extended or lean position 390 that is closer to inlet tube end 42.

A cable guide 370 is mounted to tank wall 24. A cable 350 is routed through cable guide 370 and has one end 352 that is connected to an arm 372 that is connected to end 344 of the sliding sleeve 340. The other end 354 of the cable 350 is connected to control lever or knob 360. Manual actuation of the control lever 360 by a user causes the sliding inner sleeve 340 to move between a retracted or rich position 380 that is farther from inlet tube end 42 and an extended or lean position 390 that is closer to inlet tube end 42. In the lean position 390, some of the inlet air 190 will be directed directly into the sliding inner sleeve 340 via the end 344 thereof, thereby forming a leaner fuel vapor/air mixture ratio. A user can selectively position the sliding sleeve 340 using control lever 360 to control the desired fuel vapor/air mixture ratio.

The present invention has several advantages. The elimination of carburetors and fuel injection systems reduces cost and eliminates problems due to debris and clogging. The use of an evaporated fuel vapor to operate an engine decreases fuel consumption, increases gas mileage and lowers exhaust emissions. In addition, the present invention may also be used as a hazardous waste-to-energy means and method through which discarded or unwanted flammable chemicals may be properly disposed of in compliance with city, state and federal regulations, while concurrently generating harnessable energy, such as electricity, for powering and/or driving pumps, machinery, and the like. Furthermore, in contrast to conventional incineration methods for burning chemicals, burning the chemicals as chemical vapors under compression may reduce air pollution.

It is envisioned that the various embodiments, as separately disclosed, are interchangeable in various aspects, so that elements of one embodiment may be incorporated into one or more of the other embodiments, and that specific positioning of individual elements may necessitate other arrangements not specifically disclosed to accommodate performance requirements or spatial considerations.

It is to be understood that the embodiments and claims are not limited in its application to the details of construction and arrangement of the components set forth in the description and illustrated in the drawings. Rather, the description and the drawings provide examples of the embodiments envisioned, but the claims are limited to the specific embodiments. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the U.S. Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A fuel intake system comprising:
   a fuel tank for holding a liquid fuel, the fuel tank and the liquid fuel defining a void space above the liquid fuel that contains an evaporated fuel vapor;
   an air inlet tube coupled to the tank and in fluid communication with the void space, the air inlet tube having a first end terminating outside of the tank for receiving air and a second end terminating in the void space; and
   a vapor conditioner coupled to the tank and in fluid communication with the void space, the vapor conditioner receiving the evaporated fuel vapor, the vapor conditioner having an outer tube and a sliding inner sleeve, the vapor conditioner regulating a fuel vapor/air mixture ratio by selective positioning of the sliding inner sleeve.

2. The fuel intake system of claim 1, wherein the outer tube is mounted to a tank wall.

3. The fuel intake system of claim 1, wherein the outer tube has a bore, a first end of the sliding inner sleeve mounted in the bore and a second end of the sliding inner sleeve terminating in the void space.

4. The fuel intake system of claim 1, further comprising a cable having a first end and a second end, the first end of the cable connected to the sliding inner sleeve and the second end of the cable connected to a control lever, the control lever operable to move the sliding inner sleeve.

5. The fuel intake system of claim 4, further comprising a cable guide connected to a tank wall, the cable passing through and supported by the cable guide.

6. The fuel intake system of claim 1 wherein the sliding inner sleeve is movable between a retracted position away from the air inlet tube and an extended position toward the air inlet tube.

\* \* \* \* \*